Patented Oct. 17, 1950

2,526,554

UNITED STATES PATENT OFFICE 2,526,554

PREPARATION OF BETA-HYDROXY CARBOXYLIC ACID ESTERS BY ALCOHOLYSIS OF LINEAR POLYESTERS DERIVED FROM BETA-LACTONES

Thomas L. Gresham and Jacob Eden Jansen, Akron, Ohio, assignors to The B. F. Goodrich Company, New York, N. Y., a corporation of New York No Drawing. Application July 28, 1947,
Serial No. 764,250

8 Claims. (Cl. 260—484)

This invention relates to a method for the preparation of esters of beta-hydroxy carboxylic acids such as hydracrylic acid and pertains particularly to the preparation of such compounds by the alcoholysis of linear polyesters derived from saturated aliphatic beta-lactones such as beta-propiolactone.

It is disclosed in U. S. Patent 2,356,459 to Frederick E. Küng that beta-lactones, that is, lactones or inner esters of beta-hydroxy carboxylic acids may be obtained in good yields by the reaction of a ketene with an aldehyde or ketone. In this manner beta-propiolactone (also called hydracrylic acid lactone), which has the formula

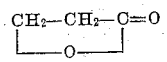

is economically obtained from ketene and formaldehyde. Similarly, by variations in the reactants, there may be obtained other saturated aliphatic beta-lactones, homologous with beta-propiolactone and possessing the general formula

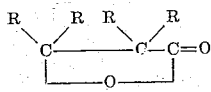

wherein each R (here and wherever appearing hereinafter) is hydrogen or an alkyl group such as methyl, ethyl, propyl, butyl or the like. Typical examples of such beta-lactones include beta-butyrolactone, beta-isobutyrolactone, beta-n-valerolactone, beta-isovalerolactone, beta-isopropyl beta-propiolactone, beta-ethyl beta-butyrolactone, alpha-methyl beta-propiolactone, alpha,alpha-dimethyl beta-propiolactone, alpha,beta-dimethyl beta-propiolactone and the like.

All these beta-lactones are readily converted by a variety of methods, as will be set forth hereinbelow, into linear polyesters containing a plurality of beta-lactone units connected to one another, i. e., they possess the structure

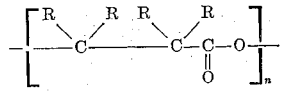

$n$ being a number greater than one.

We have now discovered that such linear polyesters react readily with alcohols in the presence of a strong acid catalyst to form esters of beta-hydroxy aliphatic monocarboxylic acids in high yields, in accordance with the general reaction equation:

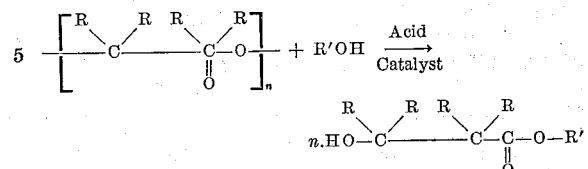

wherein R'OH represents an alcohol and $n$ is a number greater than 1. Thus, esters of hydracrylic acid are easily obtained from linear polyesters derived from beta-propiolactone and, in a similar manner, esters of other beta-hydroxy aliphatic monocarboxylic acids are secured from linear polyesters derived from the other aliphatic beta-lactones mentioned above.

This method of preparing esters of beta-hydroxy acids is quite valuable since the direct esterification of such acids is difficult and results in poor yields due to the fact that the beta-hydroxy acid loses water so readily, especially in the presence of acidic materials which are generally necessary to effect an esterification. Furthermore, it is surprising that the method should yield esters of beta-hydroxy acids rather than esters of alpha-beta unsaturated carboxylic acids since heating of the polyester in the absence of alcohol yields an alpha-beta unsaturated acid.

As mentioned hereinabove, the linear polyesters derived from beta-propiolactone or a homolog thereof and used in the reaction of this invention are characterized chemically by possessing the structure

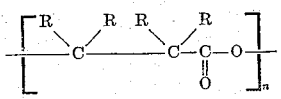

The nature of the end groups connected to this structure is of no consequence in this invention since esters of beta-hydroxy acids are obtained by reaction with alcohols in any case. However, the valence at the right of the above structure is generally satisfied by a hydrogen atom (in which event the linear polyester is more appropriately called a linear polyester acid) or by an alkyl group (in which event the linear polyester is an alkyl ester of a polyester acid). The end group at the left of the above structure varies with the method by which the linear polyester is obtained and is generally an acyloxy group preferably one of the formula

wherein $R_1$ is a hydrocarbon group such as alkyl, alkenyl, aryl, or the like; or it is an alkoxy or hydroxy group or a halogen atom. Also, the value of $n$ varies with the conditions under which the linear polyester is obtained and may be as small as 2 or as great as 50 or even greater. Physically, the linear polyesters vary in character from colorless viscous oils to white solids depending on their molecular weight (i. e., the value of $n$), the higher molecular weight polyesters being solid in nature.

Various types of linear polyesters which are suitable for use in this invention and methods of preparing them from a beta-lactone are set forth below:

(1) Polyester acids produced by polymerization of beta-propiolactone, the polymerization being effected by maintaining the lactone at a temperature of 50 to 150° C. (which is accomplished in many instances without applying external heat since the polymerization is exothermic), either alone or in the presence of a small amount (preferably from 0.1 to 2% by weight) of an acid catalyst such as sulfuric acid, hydrochloric acid, phosphoric acid or the like or an alkaline catalyst such as sodium or potassium hydroxide or carbonate or the like, or a condensation catalyst such as ferric chloride, zinc chloride, aluminum chloride or the like, either with or without added inert diluent. Polyester acids produced in this way have the general structure:

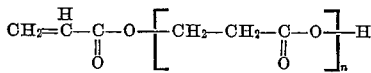

or

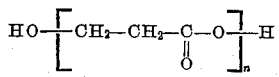

depending upon whether or not a molecule of water is eliminated from the terminal

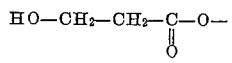

radical. The value of $n$ depends upon the time and temperature of the polymerization.

(2) Polyester acids produced by the reaction of beta-propiolactone, preferably in excess, with an alkali metal salt of a carboxylic acid in the presence of a polar solvent, preferably water. As disclosed in our copending application S. N. 620,658, filed October 5, 1945, now Patent No. 2,449,990, beta-propiolactone reacts with such salts to form salts of beta-acyloxy propionic acids which in turn react with more lactone to form salts of polyester acids (and the free polyester acids themselves upon acidification) having the formula

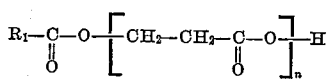

wherein

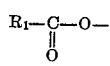

represents an acyloxy radical derived from any carboxylic acid (including aliphatic monocarboxylic acids such as acetic, propionic, caproic and other acids of the acetic series, acrylic, crotonic, oleic and other unsaturated aliphatic carboxylic acids, benzoic and other aromatic carboxylic acids, succinic, phthalic and other dicarboxylic acids and the like), and the value of $n$ depends upon the number of moles of lactone used.

(3) Polyester acids produced by the reaction of an excess of beta-propiolactone with alkali metal halides in the presence of a polar solvent, preferably water. As disclosed in the copending application S. N. 620,655, filed October 5, 1945, now Patent No. 2,449,987, beta-propiolactone reacts with such salts and forms salts of beta-halo propionic acids which in turn react with more lactone to form salts of polyester acids (and the free acids themselves upon acidification) having the formula

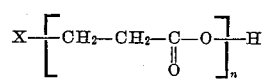

wherein X is halogen such as chlorine, bromine, or iodine and the value of $n$ depends upon the amount of lactone used.

(4) Polyester acids produced by the reaction of an excess of beta-propiolactone with an alkanol ($R_2$—OH) in the presence of an acid catalyst. Such polyester acids possess the formula

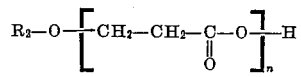

wherein $R_2$ is an alkyl radical such as methyl, ethyl, propyl, butyl, etc., and are derived as follows:

(a)

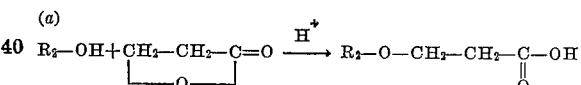

(b)

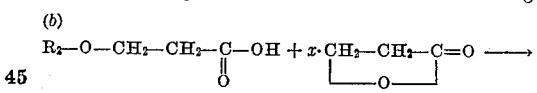

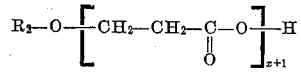

(5) Alkyl esters of polyester acids produced by the reaction of an excess of beta-propiolactone with an alkanol in the presence of an alkaline catalyst. Such polyesters possess the formula

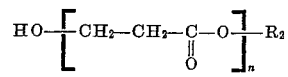

and are derived as follows:

(a)

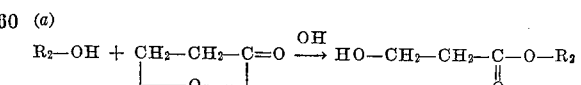

(b)

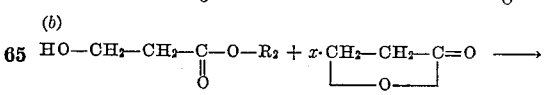

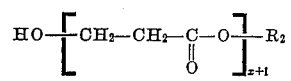

While the above types of linear polyesters have been specifically described with relation to beta-propiolactone, it is to be understood that entirely similar linear polyesters are obtained from the other aliphatic beta-lactones described above.

Moreover, it will be understood that any polyester having the structure

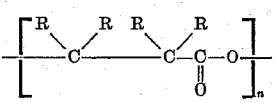

whether obtained by the methods described in (1) to (5) above or in some other way may be used in this invention.

The following procedures illustrate the preparation of specific polyesters for use in the reaction of this invention, by several of the methods described above. All parts are by weight.

PROCEDURE A.—POLYMERIZATION OF BETA-PROPIOLACTONE IN PRESENCE OF ACID CATALYST 210 parts (3 moles) of beta-propiolactone are added slowly to 1 part of concentrated sulfuric acid with constant stirring. The temperature of the mixture is maintained at 60° to 80° C. by external cooling means. The reaction product is a semi-solid material which on crystallization from acetone yields 176 parts (82%) of a mixture of two polyester acids having the formulas:

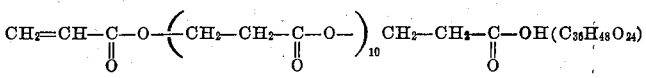

and

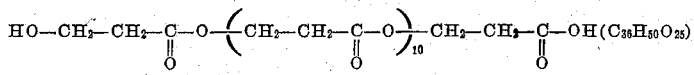

*Analysis*

Calculated for $C_{36}H_{48}O_{24}$:
    C—50%
    H—5.56%
    Neutralization Equivalent 864
    Saponification Equivalent 72
Found:
    C—49.48%
    H—5.70%
    Neutralization Equivalent 870
    Saponification Equivalent 74
Calculated for $C_{36}H_{50}O_{25}$:
    C—48.96%
    H—5.66%
    Neutralization Equivalent 882
    Saponification Equivalent 73.5

PROCEDURE B.—REACTION OF BETA-PROPIOLACTONE WITH SODIUM ACETATE 72 parts (1 mole) of beta-propiolactone are added to 82 parts (1 mole) of sodium acetate in 300 parts of water. 42.5 parts of beta-acetoxy propionic acid and 46 parts of a slightly viscous colorless oil are formed. The oil is dissolved in aqueous sodium hydroxide and upon acidification a precipitate forms which is a polyester acid of the formula:

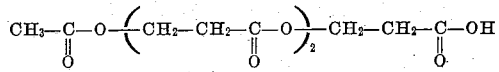

*Analysis*

Calculated for $C_{11}H_{16}O_8$:
    Neutralization Equivalent 276
    Saponification Equivalent 69
Found for $C_{11}H_{16}O_8$:
    Neutralization Equivalent 268
    Saponification Equivalent 67

When the reaction is repeated using 10 moles of beta-propiolactone to one mole of sodium acetate a higher yield of a similar polyester acid but of higher molecular weight is formed.

PROCEDURE C.—POLYMERIZATION OF BETA-PROPIOLACTONE IN PRESENCE OF FERRIC CHLORIDE CATALYST 300 parts (4.1 moles) of beta-propiolactone are added slowly to 3 parts of ferric chloride in 108.5 parts of benzene at reflux temperature. The rate of addition is such as to maintain reflux without external heating. After the addition of beta-propiolactone is complete, the benzene is decanted and 300 parts of a viscous residue comprising a polyester acid similar to the product in A above are formed.

PROCEDURE D. — POLYMERIZATION OF BETA-PROPIOLACTONE IN THE PRESENCE OF HEAT 300 parts (4.1 moles) of beta-propiolactone are heated at 130° to 150° C. for about 2 hours with stirring. The lactone gradually becomes more viscous and upon cooling thickens to a non-pourable oil comprising 300 parts of two polyester acids similar to those described in Procedure A above.

PROCEDURE E. — POLYMERIZATION OF BETA-ISOVALEROLACTONE IN THE PRESENCE OF HEAT

Beta-isovalerolactone is maintained at a temperature of about 50° C. for a period of 3 hours and a quantitative yield of a viscous material is formed. This material possesses a molecular weight of 315, which corresponds to a polyester acid of the formula

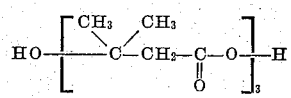

According to this invention an alcohol is reacted with a linear polyester of the type described, such as one of the materials prepared by any of the methods listed hereinabove, in the presence of an acid catalyst, and an ester of a beta-hydroxy carboxylic acid is formed, substantially one mole of such an ester being formed for each lactone unit present in the polyester used. In addition to the beta-hydroxy acid ester, however, water and another compound are formed in instances where the end group in a polyester acid is other than a hydroxy group. For example, if the polyester acid is formed simply by polymerization of beta-propiolactone in the presence of heat, or by polymerizing beta-propiolactone in the presence of a polymerization catalyst such as sulfuric acid or ferric chloride, some acrylic acid ester is formed from the end group

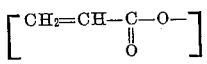

of the polyester and

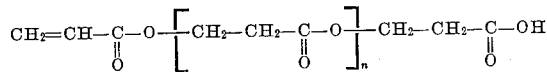

and the excess alcohol used in the reaction.

Also, when a polyester acid formed from beta-propiolactone and sodium acetate is reacted with an alcohol in accordance with this invention, an ester of acetic acid is formed from the end group

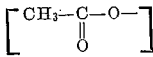

and similarly, when a polyester acid formed from beta-propiolactone and sodium chloride is reacted with an alcohol, some beta-chloropropionic acid ester is formed from the splitting off of the end group

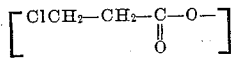

The alcohol which is reacted with the polyester may be varied widely. It may be a saturated or unsaturated, primary, secondary or tertiary, mono- or polyhydroxy aliphatic or aromatic alcohol. Among these alcohols are primary alkyl alcohols such as methyl alcohol, ethyl alcohol, propyl alcohol, butyl alcohol, amyl alcohol, hexyl alcohol, heptyl alcohol, octyl alcohol, nonyl alcohol, decyl alcohol, and the like; secondary alkyl alcohols such as isopropyl alcohol, secondary amyl alcohol, secondary hexyl alcohol, secondary octyl alcohol, and the like; tertiary alkyl alcohols such as tertiarybutyl alcohol, tertiary amyl alcohol, tertiary butylcarbinol and the like; polyhydroxy alcohols such as glycol, glycerol, triethylene glycol and other polyhydroxy alcohols, preferably containing from 2 to 4 hydroxyl groups; unsaturated aliphatic alcohols such as allyl alcohol, methallyl alcohol, propargyl alcohol and the like; alicyclic alcohols such as cyclopentanol and cyclohexanol; and aromatic alcohols such as benzyl alcohol, methylphenylcarbinol, phenylethyl alcohol, and the like. All these alcohols consist of hydrocarbon structure attached to hydroxyl.

Although any polyester of the class described and any alcohol may be used successfully in the reaction of this invention, best results are obtained when polyesters derived from beta-propiolactone are reacted with alkanols, and especially primary alkanols of 1 to 4 carbon atoms; consequently the preferred embodiments of this invention comprise reacting a beta-propiolactone polymer with methyl alcohol, ethyl alcohol or butyl alcohol to form methyl, ethyl or butyl hydracrylate.

The quantity of alcohol used depends largely on the number of lactone units in each molecule of polyester, it being desirable to use an excess of 2 to 5 moles of alcohol in addition to one mole of alcohol for each lactone unit in order to obtain solution of the polyester in the alcohol and to maintain a satisfactory reaction rate.

Any of the acid catalysts conventionally used in esterifications may be used to catalyze the reaction of this invention. Strong mineral acids such as sulfuric acid, phosphoric acid and hydrochloric acid are most desirable, but strong organic acids such as toluene sulfonic acid, and the like may be used with good results. The amount of catalyst is not critical and may be varied considerably. Amounts as small as .1% or as high as 5% or higher based on the reactants may be used although best results are obtained when approximately .5% of catalyst by weight is used.

The reaction is best carried out by placing the polyester, the alcohol and catalyst in a suitable reaction vessel fitted with a reflux condenser and temperature measuring device. The reactants are then heated preferably to reflux temperature, which is generally in the range of from 50° to 150° C., for a period of time which varies in relation to the number of lactone units per molecule, but which is generally from 16 to 50 hours. The catalyst is then neutralized by the addition of calcium carbonate, sodium carbonate, or other alkali. The precipitate which forms during the neutralization reaction is filtered off. The excess alcohol is then removed by distillation, at atmospheric pressure in the case of volatile alcohols, and the remaining solution is distilled at reduced pressures to yield the pure beta-hydroxy carboxylic acid ester.

The following specific examples, in which all parts are by weight illustrate the reaction of this invention in more detail. There are, of course, numerous possible modifications.

EXAMPLE I 115 parts of the polyester acid prepared as in procedure B above are dissolved in 320 parts of methanol containing one part of concentrated sulfuric acid. The reaction mixture is then refluxed for 16 hours. The catalyst is then neutralized by the addition of 3 parts of calcium carbonate and the precipitate of calcium sulfate and the excess calcium carbonate is filtered off. The filtrate is distilled at atmospheric pressure through a 30 plate column at a reflux ratio of 20:1 to remove a first fraction consisting of the methyl alcohol-methyl acetate binary, (B. P. 53° to 53.8° C.) and a second fraction consisting of excess methyl alcohol. The residue is then distilled at reduced pressure through a 10 x 2 cm. column packed with ¼" ceramic packing. 81 parts of methyl hydracrylate (B. P. 70° to 71° C./13 mm; $N_D^{20}$ 1.4213; $D_4^{20}$ 1.1205) are obtained.

EXAMPLE II 1000 parts of a polyester acid prepared according to procedure D, together with 1920 parts of ethyl alcohol and 5 parts of concentrated sulfuric acid are placed in a flask fitted with reflux condenser and thermometer. When complete solution is obtained the reaction mixture is heated to reflux temperature for a period of 36 hours. The acid catalyst is then neutralized by adding 15 parts of calcium carbonate. The reflux condenser is then replaced with 18" x 1¼" column packed with ¼" glass helices and equipped with a variable reflux ratio head for vacuum distillation. Part of the excess alcohol is removed at atmospheric pressure, after which the solution is filtered to free it of calcium sulfate and excess calcium carbonate and the distillation continued at 13 mm. After removal of the remainder of the alcohol 1372 parts (83.6%) of ethyl hydracrylate are obtained.

Found for ethyl hydracrylate:
 B. P.: 81 to 83° C. at 13 mm.
 Density $20_4$ 1.054
Published in literature:
 B. P. 81° C. at 13 mm.
 Density $4^{20}$ 1.059

When the above examples are repeated using n-butyl, isoamyl, allyl, n-octyl, 2-ethylhexyl, cyclohexyl and benzyl alcohols, the corresponding hydracrylic acid ester of these alcohols are produced in good yields.

EXAMPLE III 55 parts of a polyester acid prepared according to procedure E, together with 395 parts of ethyl alcohol and 2 parts of concentrated sulfuric acid are refluxed for a period of 36 hours. 10 parts of calcium carbonate are then added to neutralize the catalyst. The precipitate of calcium sulfate is then filtered off and the excess alcohol evaporated. Ethyl beta,beta-dimethyl hydracrylate (B. P. 92°–94° C. at 100 mm.; $N_D^{20}$ 1.4242) is formed in good yield.

The esters prepared according to this invention are very valuable organic intermediates for the preparation of many useful compounds. For example, hydracrylate esters are readily converted to the corresponding acrylate esters by the removal of a molecule of water. The hydracrylate esters also may be reduced to 1,3-propylene glycols and are solvents for lacquers and similar materials.

In addition to providing a convenient method for the preparation of esters of beta-hydroxy carboxylic acids, this invention also provides a means of utilizing residues resulting from the manufacture of beta-lactones. For example, the residues often obtained in the reaction of ketene with formaldehyde, after removal of monomeric beta-propiolactone, contain beta-propiolactone polymers, and have heretofore been of no particular utility, but when such residues are reacted with alcohols according to this invention valuable hydracrylates are secured. Similarly, normally-wasted high boiling polyester residues are formed in other reactions involving beta-propiolactone (including the reaction of beta-propiolactone with salts of carboxylic acids to form beta-acetoxy propionic acids, the reaction of beta-propiolactone with sodium chloride to form beta-chloropropionic acid etc.) and may also be reacted with alcohols according to this invention to yield hydracrylates.

Numerous variations and modifications in the procedure described herein will occur to those skilled in the art and are within the spirit and scope of the invention as defined in the appended claims.

We claim:

1. The method of preparing an ester of a beta-hydroxy carboxylic acid which comprises bringing together at reflux temperature and, in the presence of an acid catalyst, an alcohol of the formula R'(OH)$_x$, wherein R' is a hydrocarbon radical and $x$ is a number from 1 to 4 with a linear polyester derived from a saturated aliphatic beta-lactone and containing a plurality of connected lactone units of the formula

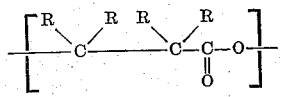

wherein each R is a member of the class consisting of hydrogen and alkyl radicals.

2. The method of preparing an ester of a beta-hydroxy carboxylic acid which comprises bringing together at reflux temperature a polyester acid derived from a saturated aliphatic beta-lactone and containing a plurality of connected lactone units of the formula

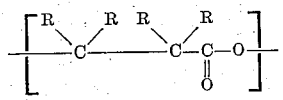

wherein R is a member of the class consisting of hydrogen and alkyl radicals, with an alcohol of the formula R'(OH)$_x$, wherein R' is an aliphatic hydrocarbon radical and $x$ is a number from 1 to 4, in the presence of an acid catalyst.

3. The method of preparing an ester of hydracrylic acid which comprises bringing together at reflux temperature a polyester acid derived from beta-propiolactone and containing a plurality of connected lactone units of the formula

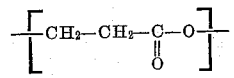

with a primary alkyl alcohol in the presence of an acid catalyst.

4. The method of preparing ethyl hydracrylate which comprises bringing together a polyester acid derived from beta-propiolactone and containing a plurality of connected lactone units of the formula

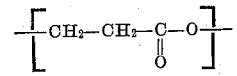

with ethyl alcohol at a temperature of 50° to 150° C. and in the presence of an acid catalyst.

5. The method of preparing methyl hydracrylate which comprises bringing together a polyester acid derived from beta-propiolactone and containing a plurality of connected lactone units of the formula

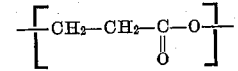

with methyl alcohol at a temperature of 50° to 150° C. and in the presence of an acid catalyst.

6. The method of preparing ethyl beta, beta-dimethyl hydracrylate which comprises bringing together a polyester acid derived from beta-isovalerolactone and containing a plurality of connected lactone units of the formula

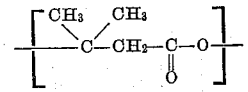

with ethyl alcohol at a temperature of 50° to 150° C. and in the presence of an acid catalyst.

7. The method of preparing ethyl hydracrylate which comprises bringing together a polyester acid derived from beta-propiolactone and containing a plurality of connected lactone units of the formula

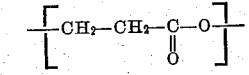

with ethyl alcohol at a temperature of 50° to 150° C. for a period of from 16 to 50 hours and in the presence of an acid catalyst, neutralizing the acid catalyst, and separating ethyl hydracrylate from the reaction mixture.

8. The method of preparing methyl hydracrylate which comprises bringing together a polyester acid derived from beta-propiolactone and containing a plurality of connected lactone units of the formula

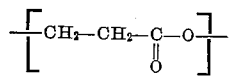

with methyl alcohol at a temperature of 50° to 150° C. for a period of from 16 to 50 hours and in the presence of an acid catalyst, and separating methyl hydracrylate from the reaction mixture.

THOMAS L. GRESHAM.
JACOB EDEN JANSEN.

REFERENCES CITED

The following references are of record in the file of this patent:

UNITED STATES PATENTS

| Number | Name | Date |
|---|---|---|
| 2,361,036 | Kung | Oct. 24, 1944 |
| 2,396,994 | Filachione | Mar. 19, 1946 |

Certificate of Correction

Patent No. 2,526,554 October 17, 1950

THOMAS L. GRESHAM ET AL.

It is hereby certified that error appears in the printed specification of the above numbered patent requiring correction as follows:

Column 2, lines 3 to 7, inclusive, for that portion of the equation reading column 7, line 6, for the word "and" read *acid*;

and that the said Letters Patent should be read as corrected above, so that the same may conform to the record of the case in the Patent Office.

Signed and sealed this 30th day of January, A. D. 1951.

[SEAL]

THOMAS F. MURPHY,
*Assistant Commissioner of Patents.*